United States Patent [19]

Bauman

[11] Patent Number: 4,972,030
[45] Date of Patent: Nov. 20, 1990

[54] ABRASION RESISTANT COMPOSITE COATING MATERIAL AND PROCESS FOR MAKING THE SAME

[75] Inventor: Bernard D. Bauman, Coopersburg, Pa.

[73] Assignee: Air Products and Chemicals, Inc., Allentown, Pa.

[21] Appl. No.: 234,865

[22] Filed: Aug. 22, 1988

[51] Int. Cl.$^5$ .............................................. C08J 31/00
[52] U.S. Cl. .................... 524/523; 524/587; 525/333.8
[58] Field of Search .............................. 524/523, 587; 525/333.8

[56] References Cited

U.S. PATENT DOCUMENTS

| | | | |
|---|---|---|---|
| 3,940,520 | 2/1976 | Dixon et al. | 427/444 |
| 4,009,304 | 2/1977 | Dixon et al. | 427/322 |
| 4,510,275 | 4/1985 | Ihikura et al. | 524/523 |
| 4,692,470 | 9/1987 | Bauman et al. | 521/55 |

OTHER PUBLICATIONS

H. Schonhorn et al., "Surface Treatment of Polymers, II Effectiveness of Fluorination as a Surface Treatment for Polyethylene". J. Appl. P. Sci, vol. 12, pp. 1231-1237 (1968).

*Primary Examiner*—Joseph L. Schofer
*Assistant Examiner*—Peter D. Mulcahy
*Attorney, Agent, or Firm*—Mark L. Rodgers; William F. Marsh; James C. Simmons

[57] ABSTRACT

The present invention is a composite coating material and a process for making the same. The composite material comprises a latex polymeric material into which has been dispersed high molecular weight polyethylene particles which have been surface treated under conditions to render the surfaces hydrophilic. The surface treated polyethylene particles are dispersed into the latex polymeric material in a concentration range of 1-50 wt. % of the total composite. When applied to a substrate, the resultant composite coating material exhibits high abrasion resistance and very low coefficients of friction after abrasive wear.

5 Claims, No Drawings

ABRASION RESISTANT COMPOSITE COATING MATERIAL AND PROCESS FOR MAKING THE SAME

TECHNICAL FIELD OF THE INVENTION

The present invention relates to a process for making composite coating materials, and also to the composite materials themselves.

BACKGROUND OF THE INVENTION

Latex coatings are finding greater usage because of ease of application/cleanup, increasingly restrictive emission regulations, and moderate costs. However, when high performance protection is required, such as abrasion resistance, latex systems are often inadequate and epoxy and polyurethane coatings must be used. These systems are considerably more expensive to purchase and apply than are latex systems, and also have greater hazards associated with worker exposure during application. Accordingly, there is presently a need for latex coatings with enhanced abrasion resistance. Past attempts to improve abrasion resistance of latex systems have involved using polymers with greater inherent strength, such as acrylics, and also making higher molecular weight polymers.

High molecular weight polyethylene (HMW PE) has outstanding abrasion resistance properties, thereby making it the material of choice for high abrasion applications, such as mining equipment, pillow blocks, wear strips, and gears. One problem associated with HMW PE is that it is difficult to fabricate into end products partially because it is not a typical thermoplastic material due to its high molecular weight. One method for making products consists of sintering HMW PE resin into solid blocks using heat and pressure which are then machined to form end products. This process is very time consuming, requires significant labor, and generates much scrap. Another method for forming HMW PE end products is by ram extrusion which is used primarily for making profiles and in which the productivity is measured in inches per hour.

A second problem associated with HMW PE is its high coefficient of thermal expansion, relative to metal. Hence, when sheets of HMW PE are clad to steel surfaces, as in protective liners for ore ships, hopper cars, and truck beds, provisions must be made to accommodate relative growth and shrinkage. Attempts to solve problems associated with attaching HMW PE to metal surfaces generally involve using many fasteners in small sheets. Recently, a mounting system was developed which consists of bolts through slotted grooves in the HMW PE sheets. These areas, in turn, have to be protected with HMW PE cover strips. In any case, installation is a time consuming and expensive process.

Attempts to solve problems associated with fabricating HMW PE end products have primarily involved blending-in lower molecular weight PE or adding softening agents in order to enable thermoplastic processing techniques to be used. These approaches have had only limited success, and they result in compromising physical performance properties. Adding other plastics with HMW PE to form a composite having a unique combination of physIcal properties is one potential solution to the above problems. In the past such composites have been produced by mechanically combining or chemically bonding two or more polymers. For example, acrylonitrilebutadiene-styrene terpolymer is produced by grafting polyacrylonitrile (a rigid polymer) onto polystyrene-butadiene (an elastic polymer). A common method for physically combining two materials into a composite is by blending. In this manner, for example, there is produced a blended composite of polybutylene terephthalate with polycarbonate (a very rigid material). The known chemical methods of making composite polymers require very precise control of processing conditions in order to produce products of desired uniform characteristics. The available physical alternatives, on the other hand, require good compatibility among the constituent materials to avoid phase separation, which limits the choice of polymers which can be thus combined with one another. This virtually rules out blends of highly elastomeric materials with rigid plastics because, most often, these are incompatible.

U.S. Pat. No. 4,692,470 discloses a method of incorporating finely divided polymeric solid particles into viscous liquids by incorporating a wetting agent which is effective for displacing absorbed air from the surface, crevices and pores of the particles thereby allowing better wetting and incorporation of the particles into the viscous liquids.

An article by H. Schonhorn, et al. entitled "Surface Treatment of Polymers. II Effectiveness of Fluorination as a Surface Treatment for Polyethylene" *J. App. P. Sci.*, Vol. 12 pp 1231–1237 (1968), discloses an effective surface treatment for adhesive bonding of polyethylene. The surface treatment disclosed involves exposing the polymer to an environment of gaseous fluorine such as fluorine diluted in argon. It is disclosed that treatment of the polymer with elemental fluorine most likely effectively eliminates the weak boundary layer associated with polyethylene by either cross-linking or by increasing the molecular weight in the surface region.

U.S. Pat. No. 4,009,304 discloses a process for improving the adhesion of polyester yarn, tire cord or fabric in polyester reinforced rubber goods, such as tires, by fluorinating the polyester yarn, tire cord or fabric prior to incorporating such into the tire or rubber goods. Additionally, U.S. Pat. No. 3,940,520 teaches a process for improving the water wicking and moisture transport properties of synthetic resins, such as polyolefins, by contacting said resins to a gaseous reaction medium containing elemental fluorine and sulfur dioxide.

BRIEF SUMMARY OF THE INVENTION

The present invention is a composite coating material and a process for making the same. The composite material comprises a latex polymeric material formed by conventional emulsion polymerization techniques. Dispersed within this latex polymeric material are high molecular weight polyethylene particles which have been surface treated under conditions to render said surfaces hydrophilic. The polyethylene (PE) particles are dispersed into the thermoset or condensation polymeric material in a concentration range of about 1–50 wt % of the total composite material.

The surface treatment of the high molecular weight polyethylene particles can be any type of treatment which is capable of rendering the particle surfaces hydrophilic. This treatment allows the polyethylene particles to be incorporated into latex formulations. As the latex coating dries, the polymer particles coalesce and flow around the surface of the treated high molecular weight PE particles. Due to their highly polar, hydrophilic surface structure, the treated high molecular weight PE particles are tenaciously adhered to by the latex polymer. This firm adhesion prevents the high molecular weight PE particles from being "popped out," and enables the PE to impart its inherent properties of abrasion resistance and low coefficient of friction to the composite material.

DETAILED DESCRIPTION OF THE INVENTION

The present invention is a composite coating material and a process for making the material. The composite material comprises a latex polymeric material into which has been dispersed high molecular weight polyethylene (HMW PE) particles which have been surface treated to render the surfaces of said particles hydrophilic. The HMW PE particles are dispersed into the latex polymeric material in a concentration range of about 1–50 wt % of the total composite.

The composite material is formed by initially treating HMW PE particles in a suitable manner to impart polar functional groups on the surface, thereby making the particles hydrophlic. Such treatments which impart reactive functionalities on the surface of the particles renders them compatible with polar systems, thereby facilitating tenacous bonding between such systems and the particles. The HMW PE particles are typically in the form of virgin resin or ground scrap, and have a molecular weight of at least 1 million, and preferably in a range of 1 to 9 million. The HMW PE particles can be treated by a wide variety of methods which are capable of imparting polar functional groups since only a resultant hydrophilic surface, and not the method of treatment, is critical. Such treatments include exposure of the particles to a fluorIne-containing gas, a plasma of an inorganic gas, a fluoro-oxidizing gas, sulfur trioxide, halogens, oxidative acids, ionizing radiation, ultraviolet light, peroxides, ozone, surfactants, and flame and corona treatment. Surface treatment of the HMW PE particles can be carried out batch-wise or in a continuous process at conditions of time, temperature and pressure which are best suited for the particular type of treatment used. The surface treatment must be suitable to render the particle surfaces hydrophilic to insure sufficient bonding of the particles to the polymeric latex material to prevent the particles from "popping out" of the composite during use. In a preferred embodiment, the HMW PE particles are treated by exposure to a gas stream containing fluorine, oxygen and inerts. The fluorine concentration in the gas stream is preferably from about 0.05% to 10% by volume, with the oxygen concentration ranging anywhere from a few ppm up to 99% by volume. Especially good adhesion of the PE particles to the latex system is achieved if the treatment method modifies the surface of said particles such that x-ray photoelectron spectroscopy indicates a surface composition of between 7–15% O, 7–15% F with the balance carbon. Hydrogen may also be present on the surface, but it is not detected by this analytical technique.

After the HMW PE particles are treated, they are added to a polymeric latex material which forms the continuous phase of the composite material. The latex material is typically any polymeric material formed by emulsion polymerization, such as acrylic latex paint and latex coatings based on styrene, vinyl acetate, methyl methacrylate and vinyl chloride monomers. The treated HMW PE particles can be simply added to the water-borne latex system, may be blended with the polymeric latex material at high temperatures or added in any other suitable manner. Whatever method is used, the particles should be mixed to close to homogeneity prior to applying the coating to the substrate to be coated. The particles should be added in a concentration of about 1–50 wt %.

The composite materials of the present Invention exhibit a wide variety of desirable properties, such as high abrasion resistance, reduced moisture absorption and reduced coefficient of friction.

The following examples are provided to illustrate the invention and are not meant to be limiting.

EXAMPLE 1

A set of experimental runs was carried out to compare the abrasion resistance of unfilled latex coating, latex coating containing two levels of untreated HMW PE and latex coating containing two levels of surface-modified HMW PE. The surface-modified HMW PE particles were treated by contacting said particles, in a batch reactor at ambient temperature and pressure, with a gas stream containing about 2.5% $F_2$, 15.75% $O_2$ and 81.65% $N_2$, all by volume for about 10 minutes. Each coating variation was studied using both one and two coats. The latex coating used for all the runs was Red Devil Acrylic Latex Gloss Enamel, Satin Black #264. Abrasion was supplied via Taber abrasion test device, using carborundum wheels which were resurfaced every 500 cycles. Abrasion resistance was assayed in two ways:

(1) The number of cycles required to break through to substrate were noted, and (2) Weight loss at time of breakthrough was measured.

The results of these runs are set out in Table 1 below.

TABLE 1

| Sample | Cycles to Break Through | Wt. Loss (g) | Wt. Loss/Cycle |
|---|---|---|---|
| Unfilled | | | |
| 1-coat | 30 | 0.042 | $1.4 \times 10^{-3}$ |
| 2-coats | 80 | 0.080 | $1.0 \times 10^{-3}$ |
| 15% Untreated | | | |
| 1-coat | 150 | 0.108 | $7.2 \times 10^{-4}$ |
| 2-coats | 600 | 0.261 | $4.3 \times 10^{-4}$ |
| 30% Untreated | | | |
| 1-coat | 200 | 0.192 | $9.6 \times 10^{-4}$ |
| 2-coats | 540 | 0.426 | $7.9 \times 10^{-4}$ |
| 15% Treated | | | |
| 1-coat | 220 | 0.082 | $3.7 \times 10^{-4}$ |
| 2-coats | 1500+ | 0.239 | $1.6 \times 10^{-4}$ |
| 30% Treated | | | |
| 1-coat | 400 | 0.120 | $3.0 \times 10^{-4}$ |
| 2-coats | 3100+ | 0.484 | $1.6 \times 10^{-4}$ |

From the results of Table 1 above it can be seen that all of the HMW PE latex coatings performed significantly better than the unfilled coatings. The treated coatings also performed much better than the untreated coatings for both levels of HMW PE particles. Additionally, formulations containing 30% HMW PE exhibited superior abrasion resistance than those containing 15%.

EXAMPLE 2

Additional experimental runs were carried out using three different HMW PE size particles in the same type of latex coating used in Example 1 above. The three different particle sizes tested are described in Table 2 below.

TABLE 2
HMW PE PARTICLE SIZE DISTRIBUTION

| U.S. Mesh (m) | Sieve Analysis - Percent Passing | | |
|---|---|---|---|
| | XMP-21 | XMP-22 | XMP-24 |
| 325 (44) | 2.5 | 12 | 65 |
| 200 (74) | 3.7 | 20 | 95 |
| 170 (88) | 4.7 | 30 | 98 |
| 140 (105) | 6.5 | 35 | 99 |
| 100 (150) | 10 | 70 | 100 |
| 80 (177) | 27 | 87 | — |
| 60 (250) | 92 | 97 | — |
| 40 (420) | 99 | 99 | — |

The particles were surface modified by contacting them, in a batch reactor at ambient temperature and pressure, with a gas stream containing about 2.5% $F_2$, 15.75% $O_2$ and 81.75% $N_2$, all by volume for about 10 minutes. The surface modifications imparted to each particle size group were essentially the same, as evidenced by X-ray photoelectron spectroscopy. Abrasion resistance of the coatings was measured as in Example 1 above, and the results are reported in Table 3 below.

TABLE 3
VARIOUS SIZE HMW PE PARTICLES IN ACRYLIC LATEX PAINT

| | Coats | Cycles to Break Through | Wt. | Loss | Loss/Cycle |
|---|---|---|---|---|---|
| Control | 1 | 30 | 30.292 | 0.042 | 0.0014 |
| No Partcles | 2 | 80 | 28.985 | 0.080 | 0.0010 |
| 15% Untreated | 1 | 150 | 29.448 | 0.108 | 0.000720 |
| XMP-24 | 2 | 600 | 28.972 | 0.261 | 0.000435 |
| 30% Untreated | 1 | 200 | 27.814 | 0.192 | 0.000960 |
| XMP-24 | 2 | 540 | 29.409 | 0.426 | 0.000789 |
| 15% Treated | 1 | 220 | 30.693 | 0.082 | 0.000373 |
| XMP-24 | 2 | 1550 | 30.773 | 0.239 | 0.000159 |
| 30% Treated | 1 | 400 | 28.550 | 0.120 | 0.000300 |
| XMP-24 | 2 | 3100 | 32.744 | 0.484 | 0.000156 |
| 15% Treated | 1 | 80 | 31.590 | 0.085 | 0.001062 |
| XMP-22 | 2 | 600 | 32.602 | 0.209 | 0.000348 |
| 30% Treated | 1 | 300 | 31.764 | 0.124 | 0.000413 |
| XMP-22 | 2 | 3500 | 31.274 | 0.565 | 0.000161 |
| 15% Treated | 1 | 150 | 30.342 | 0.103 | 0.000686 |
| XMP-21 | 2 | 2300 | 32.049 | 0.404 | 0.000175 |
| 30% Treated | 1 | 1200 | 29.629 | 0.199 | 0.000166 |
| XMP-21 | 2 | 3900 | 31.127 | 0.536 | 0.000137 |

Evaluating the relative abrasion resistance performance reported above shows that all HMW PE-containing coatings significantly out performed the unfilled coating. Additionally, surface-treated particle-filled coatings out performed coatings containing untreated HMW PE particles. Evaluating cycles to breakthrough, it appears that larger size particles give somewhat better performance, however this may be a result of the larger particles causing those coatings to be thicker. Additionally, evaluating relative loss/cycle indicates that finer particles give superior abrasion resistance. It is apparent however, that improved abrasion resistance is achieved by the addition of a wide variety of sizes of surface treated HMW PE particles.

Having thus described the present invention, what is now deemed appropriate for Letters Patent is set out in the following appended claims.

What is claimed:

1. A composite coating material which exhibits high abrasion resistance and low coefficient of friction after abrasion wear comprising: a latex polymeric material, into which has been dispersed high molecular weight polyethylene particles which have been surface treated with a reactive gas stream containing fluorine to yield a surface composition, as evidenced by x-ray photoelectron spectroscopy, comprising 7–15% O, 7–15% F, with the balance inerts, said particles comprising about 1–50 wt % of the composite material.

2. A composite material in accordance with claim 1 wherein said polyethylene particles have a molecular weight in a range from 1 to 9 million.

3. A composite material in accordance with claim 1 wherein said latex polymeric material is acrylic latex paint.

4. A composite material in accordance with claim 1 wherein said high molecular weight polyethylene particles are in the form of virgin resin or ground scrap.

5. A composite material in accordance with claim 1 wherein the latex polymeric material is a latex coating based on monomers of styrene, vinyl acetate, methyl methacrylate, vinyl chloride and mixtures thereof.

* * * * *